United States Patent [19]
Hodge et al.

[11] 3,743,363
[45] July 3, 1973

[54] BRAKING APPARATUS

[75] Inventors: Peter Charles Hodge; George Frankl, both of London, England

[73] Assignee: Simms Group Research and Development Limited, London, England

[22] Filed: Jan. 18, 1972

[21] Appl. No.: 218,752

[30] Foreign Application Priority Data
  Jan. 21, 1971  Great Britain.................... 2,877/71

[52] U.S. Cl.............................. 303/21 F, 303/10
[51] Int. Cl............................................. B60t 8/06
[58] Field of Search................. 303/21 F, 10, 61, 303/68; 188/181 A

[56] References Cited
UNITED STATES PATENTS
| | | | |
|---|---|---|---|
| 3,539,227 | 11/1970 | Drutchas et al. | 303/10 X |
| 3,514,162 | 5/1970 | Erlebach et al. | 303/21 F |
| 3,661,427 | 5/1972 | Hodge | 303/21 F |
| 3,672,731 | 6/1972 | Koivunen | 303/21 F |

*Primary Examiner*—M. Henson Wood, Jr.
*Assistant Examiner*—John J. Love
*Attorney*—Watson, Cole, Grindle & Watson

[57] ABSTRACT

A braking system for a vehicle wheel which system comprises a reservoir, and a pump pumping liquid from the reservoir through a conduit and back to the reservoir in relation to the vehicle wheel speed. A progressively closable restriction is provided downstream of a connection to the brakes so liquid pressure upstream of the closable restriction may be increased to apply the brakes. A leakage conduit is provided to by-pass the closable restriction and the connection, and incorporates a variable restriction the opening of which increases with increased vehicle wheel speed. Means are provided to sense the rate of change of wheel rotational speed, and when the rate exceeds a predetermined value, a pressure reducing valve is operated to relieve pressure applied to the brakes.

8 Claims, 1 Drawing Figure

PATENTED JUL 3 1973
3,743,363
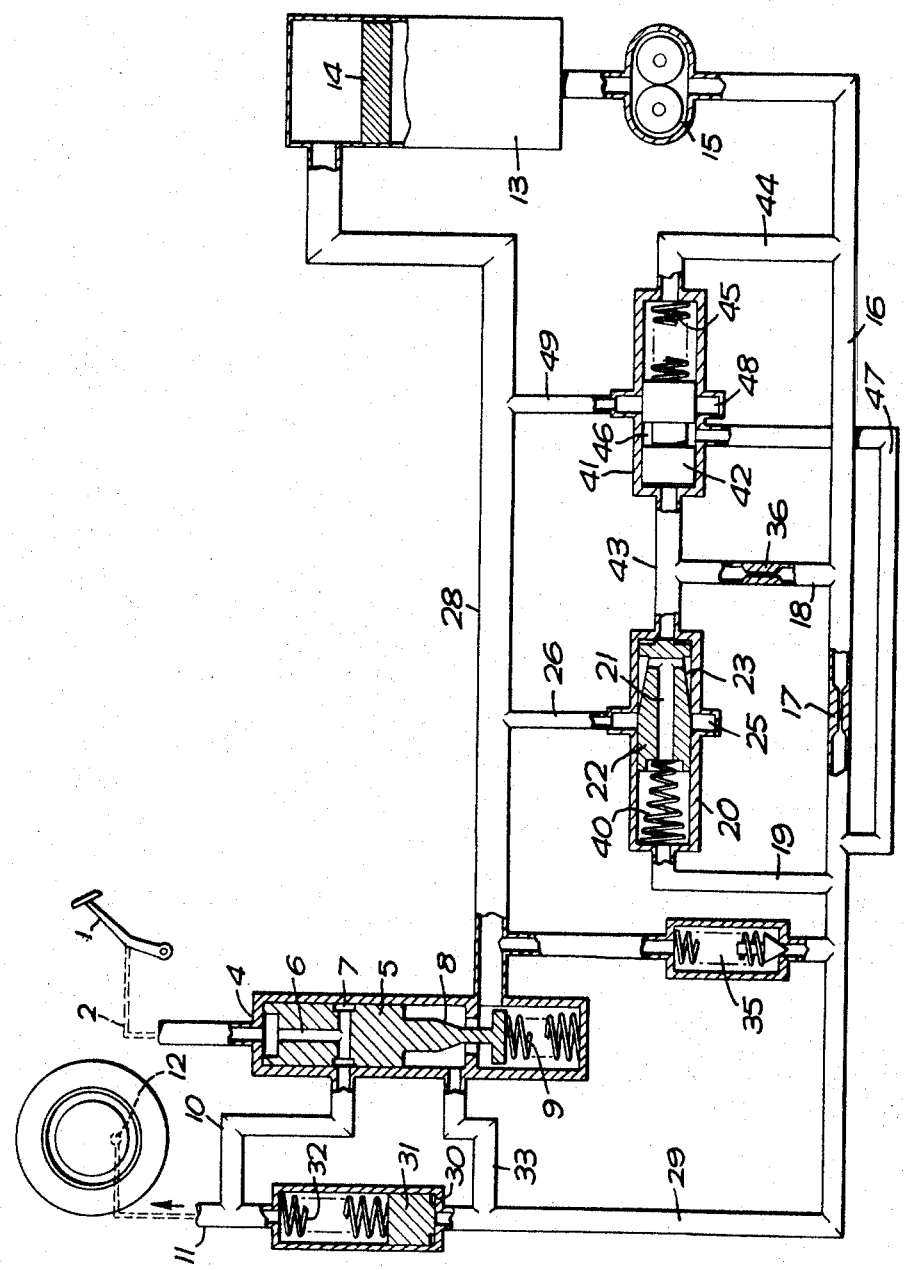

BRAKING APPARATUS

BACKGROUND OF THE INVENTION

The invention relates to braking systems.

The invention is a modification of the invention described in U S Pat. application Ser. No. 16,286, now U.S. Pat. No. 3,661,427 dated May 9, 1972 and commonly owned herewith in which there is described and claimed a braking system for a vehicle wheel comprising brake operating means, a reservoir for liquids, a pump having a drive means which increases the pump throughput with increased wheel rotational speed, means to connect the pump input with the reservoir, a conduit connecting the pump output to the reservoir, a connection between the conduit and the brake operating means, brake applying means located downstream of the connection and operable to add a restriction into the conduit so that the liquid pressure in the connection is increased, a leakage conduit arranged to bypass the brake applying means, which leakage conduit incorporates a variable restriction to provide a variable restriction to liquid flow and a fixed restriction in series with the variable restriction, and means to vary the variable restriction automatically with increased wheel rotational speed.

SUMMARY OF THE INVENTION

With such a system, it is important that the braking performance is constant over a wide wheel rotational speed band and also serves to eliminate lock of the wheel over that band. It is an object of the present invention to provide a system which operates over a wheel rotational speed band without loss of braking performance and prevents wheel-lock for all wheel rotationAl speeds in a band which is wider than that allowed by that system described in the aforementioned patent. In accordance with this object, the invention provides a braking system for a vehicle wheel comprising;
  a. brake operating means;
  b. a reservoir for liquids;
  c. a pump having drive means which increases the pump throughput with increased wheel rotational speed;
  d. means to connect the pump input with the reservoir;
  e. a conduit connecting the pump output with the reservoir;
  f. a connection between the conduit and the brake operating means;
  g. brake applying means located downstream of the connection, and operable to add a restruction into the conduit so that the liquid pressure in the connection is increased;
  h. a leakage conduit arranged to bypass the brake applying means, Which leakage conduit incorporates a variable restriction to provide a variable restriction to liquid flow;
  i. means to vary the variable restriction automatically with increased wheel rotational speed;
  j. means to sense the rate of change of wheel rotational speed;
  k. pressure reducing means operable by the means to sense the rate of change of wheel rotational speed when the rate of change exceeds a predetermined value, said pressure reducing means being operable to reduce the pressure applied to the brake applying means.

Said means to sense the rate of change of wheel rotational speed may comprise means to produce a fluid pressure difference which is dependent on the rate of change of wheel rotational speed.

The pressure reducing means may comprise valve means connected in parallel with the liquid leakage path, the valve means being operable by said pressure difference.

In the last described arrangement, the valve means may comprise a housing, and a shuttle slidable within said housing, the two sides of the shuttle being connected across the pressure difference such that when the pressure difference exceeds a predetermined value, the valve means opens.

In the case in which the leakage conduit includes a variable restriction comprising a cylinder, a shuttle slidable within the cylinder and providing in combination therewith the variable restriction, a further restriction in the main delivery path from the pump to sense the output provided by the pump, the two sides of the shuttle being open to the pressures at the two sides of the further restriction respectively and in which a damping restriction is provided in the path between the high pressure side of the further restriction and shuttle, one of the sides of the pressure reducing valve means may be connected to the high pressure side of the further restriction and the other of the sides of the pressure reducing valve means may be connected to the variable restriction shuttle side of the damping restriction.

In the last described arrangement spring means may be provided to bias the shuttle of the variable restriction towards the end of its cylinder which is connected to the damping restriction.

The spring means may comprise a conical coil spring having a predetermined load/extension characteristic, The pressure reducing valve means may have spring means to bias its shuttle towards a position in which the valve is closed, the pressure difference being applied to the pressure reducing valve means to open the valve.

BRIEF DESCRIPTION OF THE DRAWINGS

The following is a description of one preferred embodiment of the invention, given by way of example, reference being made to the accompanying drawing which shows diagrammatically a braking system for a vehicle.

DESCRIPTION OF PREFERRED EMBODIMENT

The braking system shown in the accompanying drawing is similar to that shown and described in the aforementioned patent, and parts common to both systems are given like reference numerals.

Referring to the drawing, the system comprises a brake pedal 1 connected to a master cylinder (not shown) which, on depression of the pedal 1, pumps fluid through a line 2 to a cylinder 4. The cylinder 4 has a valve member 5 mounted for reciprocation therein and in fluid tight relationship therewith, there being an axial conduit 6 in the valve member 5 communicating with an annular groove 7 such that fluid pumped by the master cylinder may pass through the conduit 6 and annular groove 7 into a conduit 10 communicating with a side of the cylinder 4 when the valve member is in the position shown. The conduit 10 communicates with a further conduit 11 and thereafter to the brake circuit of a wheel or wheels (not shown) of the vehicle. A spring 9 urges the valve member 5 to the position shown.

A pump 15, having a throughput substantially proportional to wheel speed and substantially independent of output pressure over the operation speed range, such as transfer, piston or gear pump, is arranged to draw brake fluid from a tank 13 having a filter 14 mounted therein. The pump is driven by a road wheel having a braking system connected to the conduit 11. The pump 15 is arranged to pump brake fluid along a conduit 16, through a sensing restriction 17, into conduit 29 and then conduit 28 via conduit 33, in which latter conduit is located a valve comprising a conical portion 8 of the valve member 5 and a co-operating portion of the cylinder 4. A pressure relief valve device of known design is indicated at 35 and connects conduit 29 to conduit 28. A cylinder 30 having a plug 31 mounted therein and biased to one end of the cylinder by spring 32 is connected to the conduit 29 such that a rise in pressure in conduit 29 causes the plug 31 to move against the action of the spring 32 and causes a substantially similar pressure rise of the fluid in conduit 11 to apply the brakes of the road wheel or wheels.

The sensing restriction 7 in conduit 16 results in a differential in the pressure, when the pump is pumping fluid along conduit 16, of fluid in a conduit 18 and a conduit 19 connecting into the conduit 16 and conduit 29 each side respectively of the restriction 17, the conduits 18 and 19 being connected to each end respectively of a control valve device indicated at 20. The conduit 18 is provided with a damping restriction 36.

A shuttle 22 is housed within the bore of the control device 20 and has tapered flats 23 provided on its surface in a manner similar to that described in the aforementioned patent. The bore has an annular groove 25 disposed part way between its ends, to which groove there is connected a conduit 26 communicating with the conduit 28. The shuttle 22 is provided with a bore 21 from its left hand end (in the drawing) which communicates with the outer surface of the shuttle 22 adjacent the tapered flats 23, so that a restriction is provided to fluid passing from conduit 19 to conduit 26, the opening of the restriction being dependent on the position of the shuttle 22 in the bore. The control device 20 differs from that described in the aforementioned patent in that a conical coil spring 40 is provided to urge the shuttle 22 towards the right (in the drawing), the spring having a predetermined load/deflection characteristic, which may be linear or non-linear.

A brake pressure reducer valve 41 is provided, which is arranged to provide a path for fluid from conduit 29 into conduit 28 under certain conditions of operation as described below. The brake pressure reducer valve 41 comprises a shuttle 42 reciprocable within a housing the left hand end (in the drawing) of the shuttle 42 being in communication with the right hand side of the shuttle 22 by means of a conduit 43, and the right hand end of the shuttle 42 being in communication with the conduit 16 by means of a conduit 44. The shuttle 42 is urged towards the left hand end of its housing by means of a helical coil spring 45.

The shuttle 42 of the brake pressure reducing valve 41 has an annular groove 46 formed on its surface, there being a conduit 47 connected to the conduit 20 and in communication with the space defined by the groove 46. The bore of the housing in which the shuttle 42 is mounted is provided with an outwardly extending annular groove 48, there being a conduit 49 connecting the conduit 28 to the annular groove 48. The annular groove 48 is disposed in the cylinder adjacent the connection of conduit 47 with the bore such that the groove 46 in the shuttle 42 may place the conduit 47 in communication with the conduit 49 when the shuttle 42 is moved to the right, to permit fluid to be pumped along conduit 47 into conduit 49 and thence into conduit 28.

The brake system operates generally in a similar manner to that described in the patent cited earlier herein in that, when the road wheel rotates, fluid is pumped by pump 15 along conduit 16, through orifice 17 into conduit 29, and is then returned into the reservoir 13 through conduit 33 and conduit 28. In order to actuate the brakes, the pedal 1 is depressed which initially pumps brake fluid into the cylinder 4 through conduit 6 into conduit 10 and conduit 11 to actuate the brakes. After this initial pumping of fluid, the valve member 5 is moved against the action of spring 9 so that conduit 10 is placed out of communication with conduit 2 and so that the tapered portion 8 of the valve member 5 co-operating with the cylinder 4 places a restriction in the path of fluid pumped between conduicts 33 and 28 respectively. This causes the pressure of fluid pumped along conduit 29 to rise, so that the plug 31 is moved against the action of the spring 32 to increase the pressure in conduit 11 thereby further applying the brakes to the road wheel or wheels.

With high rotational wheel speeds, a relatively high differential pressure is generated by pump 15 across restriction 17. This forces the shuttle 22 towards the left-hand side of its housing against the action of spring 40 and the relatively large extent of the opening provided by the flats 23 then in communication with annular groove 25 permits fluid to be pumped from conduit 29 through conduit 19 into conduit 26 and then into conduit 28. At low rotational wheel speeds, the shuttle 22 is urged by the spring 40 towards the right since only a low differential pressure is generated across restriction 17. The load/deflection characteristics of the conical coil spring 40 are arranged such that the rate of movement of the shuttle 22 is in direct proportion to the rate of acceleration or deceleration of the wheel driving the pump 15. During deceleration of the wheel driving the pump 15 and the consequential movement of the shuttle 22 to the right, the orifice 36 resists flow of fluid from conduit 43 into conduit 16, and hence there is a pressure rise in conduit 43. When the pressure difference between that in conduit 43 and that in conduit 44 (which is substantially the output pressure of the pump 15) rises above a predetermined value and is sufficient to move the shuttle 42 to the right against the action of the spring 45, conduit 47 is placed in communication with conduit 49 and the pressure in conduit 29 is relieved. This relieves the total pressure applied to the plug 31, and consequently the brakes on the road wheels are released to a certain extent. This permits the road wheel to start rotating at a higher rate again, and the output of the pump 15 will rise once more so that the pressure difference between conduits 43 and 44 will fall, thus closing the brake pressure reducer valve.

It will be appreciated that with the above described system, if the road wheel driving the pump 15 is decelerated at a rate greater than a predetermined value (for example, if the wheel locks suddenly whilst being braked) the brake pressure reducing valve 41 will operate to relieve pressure in the conduit 29 so that the brakes are automatically released to a certain extent, whereafter the wheel may commence to rotate again.

We claim:
1. A braking system for a vehicle wheel, comprising:
   a. brake operating means;
   b. a reservoir for liquids;
   c. a pump having drive means which increases the pump throughput with increased wheel rotational speed;
   d. means to connect the pump input with the reservoir;
   e. a conduit connecting the pump output with the reservoir;
   f. a connection between the conduit and the brake operating means;
   g. brake applying means located downstream of the connection, and operable to add a restriction into the conduit so that the liquid pressure in the connection is increased;
   h. a leakage conduit arranged to bypass the brake applying means, which leakage conduit incorporates a variable restriction to provide a variable restriction to liquid flow;
   i. means to vary the variable restriction automatically with increased wheel rotational speed;
   j. means to sense the rate of change of wheel rotational speed;
   k. pressure reducing means operable by the means to sense the rate of change of wheel rotational speed, when the rate of change exceeds a predetermined value, said pressure reducing means being operable to reduce the pressure applied to the brake applying means.

2. A braking system as claimed in claim 1, in which said means to sense the rate of change of wheel rotational speed comprises means to produce a fluid pressure difference which is dependent on the rate of change of wheel rotational speed.

3. A braking system as claimed in claim 2 in which the pressure reducing means comprises valve means connected in parallel with the liquid leakage path, the valve means being operable by said pressure difference.

4. A braking system as claimed in claim 3, in which the valve means comprises a housing, and a shuttle slidable within said housing, the two sides of the shuttle being connected across the pressure difference such that when the pressure difference exceeds a predetermined value, the valve means opens.

5. A braking system as claimed in claim 4, and in which the leakage conduit includes a variable restriction comprising a cylinder, and a shuttle slidable within the cylinder and providing in combination therewith the variable restriction, a further restriction in the main delivery path from the pump to sense the pump throughput, the two sides of the shuttle being open to the pressures at the two sides of the further restriction respectively there being a damping restriction provided in the path between the high pressure side of the further restriction and shuttle, wherein one of the two sides of the pressure reducing valve means is connected to the high pressure side of the further restriction and the other of the sides of the pressure reducing valve means is connected to the variable restriction shuttle side of the damping restriction.

6. A braking system as claimed in claim 5, in which spring means are provided to bias the shuttle of the variable restriction towards the end of its cylinder which is connected to the damping restriction.

7. A braking system as claimed in claim 6, in which the spring means comprises a conical coil spring having a predetermined load/extension characteristic.

8. A braking system as claimed in claim 4, in which the pressure reducing valve means has spring means to bias its shuttle towards a position in which the valve is closed, the pressure difference being applied to the pressure reducing valve means to open the valve.

* * * * *